United States Patent
Hitoshi

(10) Patent No.: US 6,316,879 B1
(45) Date of Patent: Nov. 13, 2001

(54) DRIVER CIRCUIT FOR ORGANIC ELECTROLUMINESCENT DISPLAY

(75) Inventor: Wakai Hitoshi, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/486,380

(22) PCT Filed: May 24, 1999

(86) PCT No.: PCT/JP99/02727

§ 371 Date: Feb. 28, 2000

§ 102(e) Date: Feb. 28, 2000

(87) PCT Pub. No.: WO00/01202

PCT Pub. Date: Jan. 6, 2000

(30) Foreign Application Priority Data

Jun. 30, 1998 (JP) .................................... 10-183136

(51) Int. Cl.[7] ...................................... G09G 3/10
(52) U.S. Cl. ................ 315/169.3; 315/167; 257/40; 313/504
(58) Field of Search .................. 315/169.3, 169.1, 315/167; 313/504, 310; 257/40, 99

(56) References Cited

U.S. PATENT DOCUMENTS

| 4,538,507 | 9/1985 | VanSlyke et al. | 313/504 |
| 5,593,788 | * 1/1997 | Shi et al. | 428/690 |
| 5,886,474 | * 3/1999 | Asai et al. | 315/169.1 |
| 5,965,901 | * 10/1999 | Heeks et al. | 257/40 |
| 6,043,510 | * 3/2000 | Kawamoto | 257/40 |
| 6,097,139 | * 8/2000 | Tuck et al. | 313/310 |

FOREIGN PATENT DOCUMENTS

| 2-10693 | 1/1990 | (JP) . |
| 5-205873 | 8/1993 | (JP) . |
| 5-307996 | 11/1993 | (JP) . |
| 6-32307 | 4/1994 | (JP) . |
| 7-122361 | 5/1995 | (JP) . |
| 9-16123 | 1/1997 | (JP) . |

\* cited by examiner

Primary Examiner—Haissa Philogene
(74) Attorney, Agent, or Firm—McDermott, Will & Emery

(57) ABSTRACT

A simple driver circuit used for an organic electroluminescent (EL) device comprises a transparent substrate on which an anode, at least one organic layer, and a cathode are formed. The anode is made of a transparent conductive material. The cathode is made of a conductive metal material. The driver circuit has a resistor electrically connected with the EL device to form a series circuit. A DC power supply is connected with this series circuit.

3 Claims, 4 Drawing Sheets

DRIVER CIRCUIT FOR ORGANIC ELECTROLUMINESCENT DISPLAY

BACKGROUND OF THE INVENTION

1. Field of the Invention

The present invention relates to a circuit for driving an organic electroluminescent (EL) circuit.

2. Description of the Related Art

An organic electroluminescent (EL) device comprising a transparent substrate on which an anode, at least organic layer, and a cathode are formed is disclosed, for example, in Japanese Patent Publication No. 32307/1994. The anode is made of a transparent conductive material. The organic layer consists either of an organic emissive layer or of a multilayer structure containing organic layers such as a hole injection layer. If necessary, a hole transport layer is added to the multilayer structure. The cathode is made of a conductive metal material.

In this organic EL device, a DC voltage of several volts to tens of volts is applied between the anode and the cathode to cause the organic layer to emit light. The organic EL device has the advantage that it can be driven at a lower driving voltage than other kinds of EL devices.

Generally, a driver circuit for this kind of organic EL device is composed of a constant-current circuit. A known circuit is shown in FIG. 7, where the organic EL device is indicated by 01 and has an anode 02 and a cathode 03. A DC power supply supply 06 such as a battery is connected with the EL device 01 via a series combination of a transistor 04 and a resistor 05. A series combination of a zener diode 07 and a resistor 08 is connected in parallel with the DC power supply 06. The neutral point of this series circuit is connected with the positive terminal of an operational amplifier 09. The negative terminal of the amplifier 09 is connected with the junction of the amplifier 09 and the transistor 04. This driver circuit limits the current supplied to the organic EL device 01 to a certain value at all times.

This driver circuit for an organic EL device needs numerous electronic components including transistor 04 and operational amplifier 09. Where numerous display segments are formed on the anode 02, or where plural anodes 02 and plural cathodes 03 intersect to form a matrix structure, it is necessary to prepare the aforementioned electronic components for each of the electrodes. This increases the number of components, leading to an increase in the cost.

SUMMARY OF THE INVENTION

It is an object of the present invention to provide an organic. EL device driver circuit free of the foregoing problems.

A DC power supply (4) is connected with an organic electroluminescent (EL) device (1) having an anode (2) and a cathode (3). Thus, a driver circuit that is simple and made up of an unincreased number of components is obtained.

The organic EL device (1) and a resistor (5) are electrically connected to form a series circuit. The DC power supply (4) is connected with this series circuit. In particular, the resistor (5) is connected with the anode (2) of the organic EL device (1) to form the series circuit with which the DC power supply (4) is connected.

In this way, the driver circuit for the organic EL device is simple in structure and made up of an unincreased number of components. Furthermore, the driver circuit is insusceptible to ambient temperature variations.

Other objects and features of the invention will appear in the course of the description thereof, which follows.

DESCRIPTION OF THE PREFERRED EMBODIMENTS

Figure 1:
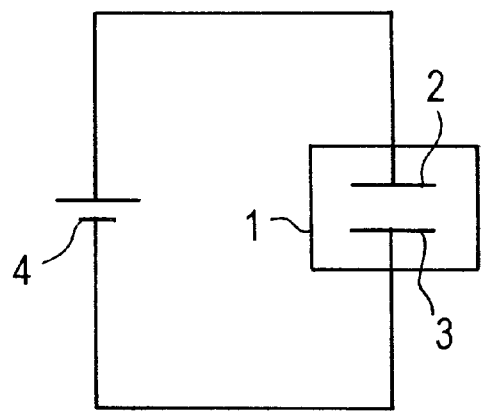
FIG. 1 is a diagram of a driver circuit in accordance with a first embodiment of the present invention.
Figure 2:
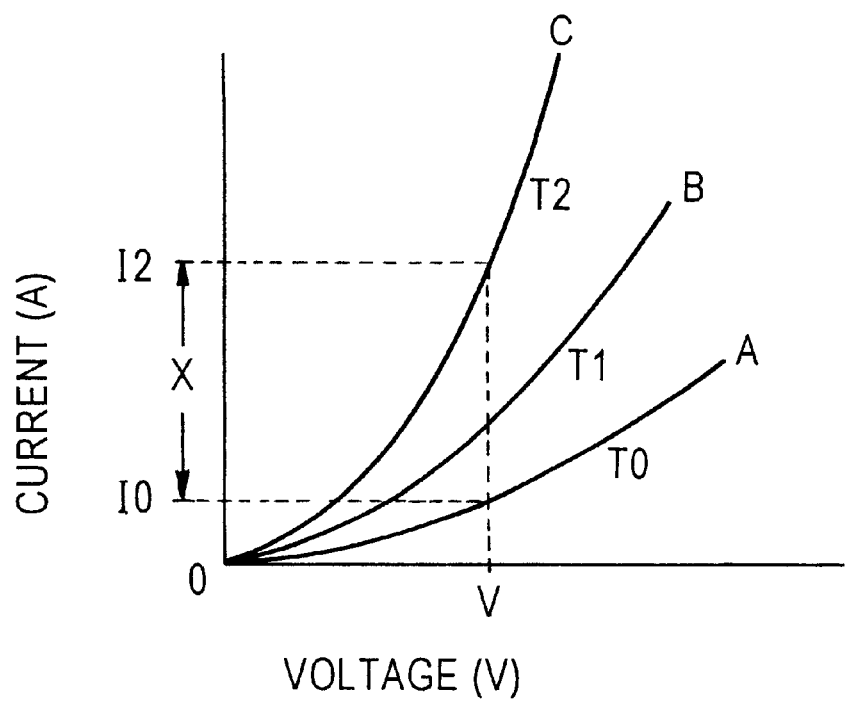
FIG. 2 is a graph showing the voltage-current characteristics of the driver circuit shown in FIG. 1.
Figure 3:
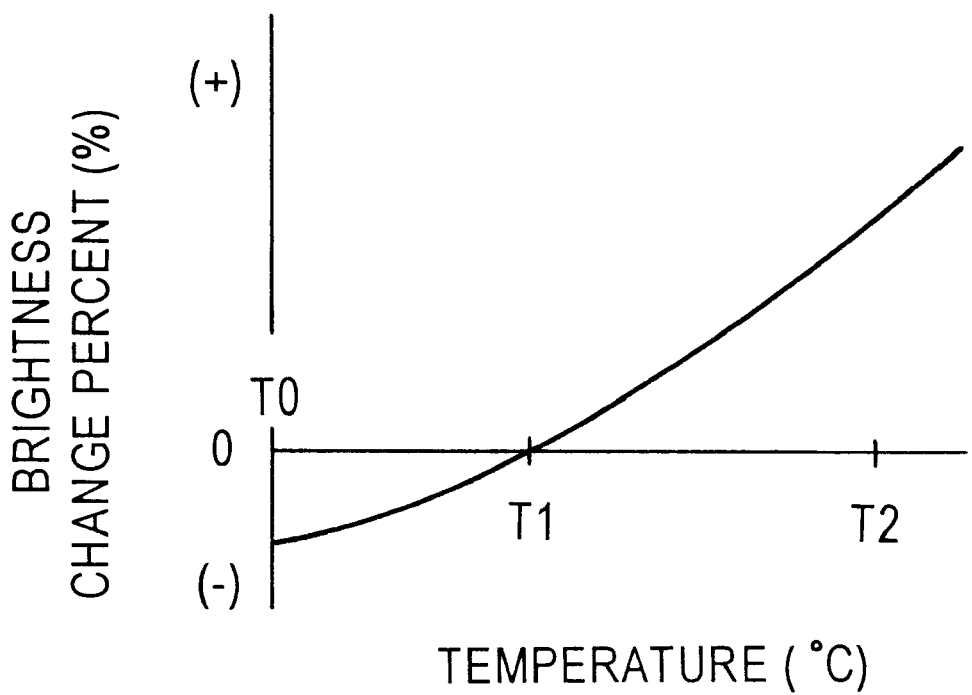
FIG. 3 is a graph showing the temperature-brightness change percent characteristics of the driver circuit shown in FIG. 1.

The preferred embodiments of the present invention are hereinafter described with reference to the accompanying drawings. FIGS. 1–3 pertain to a driver circuit in accordance with a first embodiment of the invention. In FIG. 1, an organic electroluminescent (EL) device is generally indicated by numeral 1 and has an anode 2 and a cathode 3. A DC power supply 4 is connected in series with the organic EL device 1.

Figure 7:
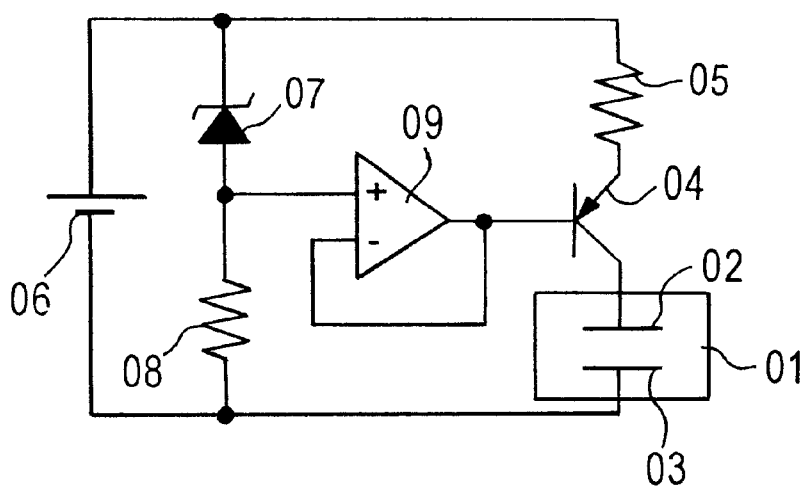
FIG. 7 is a diagram of a conventional driver circuit.

Specifically, the organic EL device 1 is driven by a constant voltage from the DC power supply 4 to emit light. The number of components is reduced compared with the conventional driver circuit (FIG. 7) driven by a constant current. The novel driver circuit for the organic EL device is simple in structure and made up of an unincreased number of components.

It is known that the current flowing through the organic EL device 1 driven by the driver circuit described above varies with the voltage of the DC power supply 4, as shown in FIG. 2, and that the current varies with the ambient temperature even if the voltage is kept constant. It is also known that the brightness of emission from the organic EL device 1 is roughly proportional to the current flowing through the EL device 1. Therefore, in this configuration, if the same voltage is applied, the brightness varies greatly in response to ambient temperature variations as shown in FIG. 3.

It is now assumed that the ambient temperature satisfies the relation T0<T1 (room temperature)<T2. Let V be the driving voltage from the DC power supply 4. The operating point of the organic EL device is given by the intersection of the voltage-current characteristic curve (A, B, or C in FIG. 2) of the EL device 1 with the driving voltage V at temperature T0, T1, or T2. If the voltage V is kept constant, the current varies from $I_0$ to $I_2$ (within the range X in FIG. 2). Consequently, the brightness is varied greatly (see FIG. 3).

Figure 4:
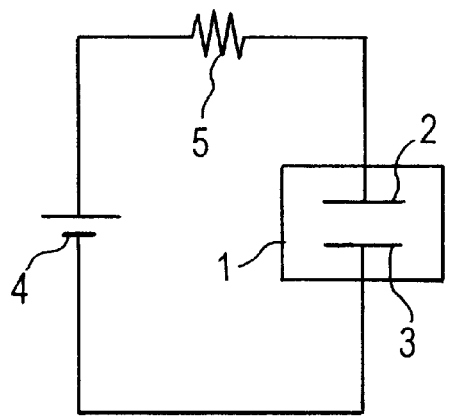
FIG. 4 is a diagram of a driver circuit in accordance with a second embodiment of the present invention.
Figure 5:
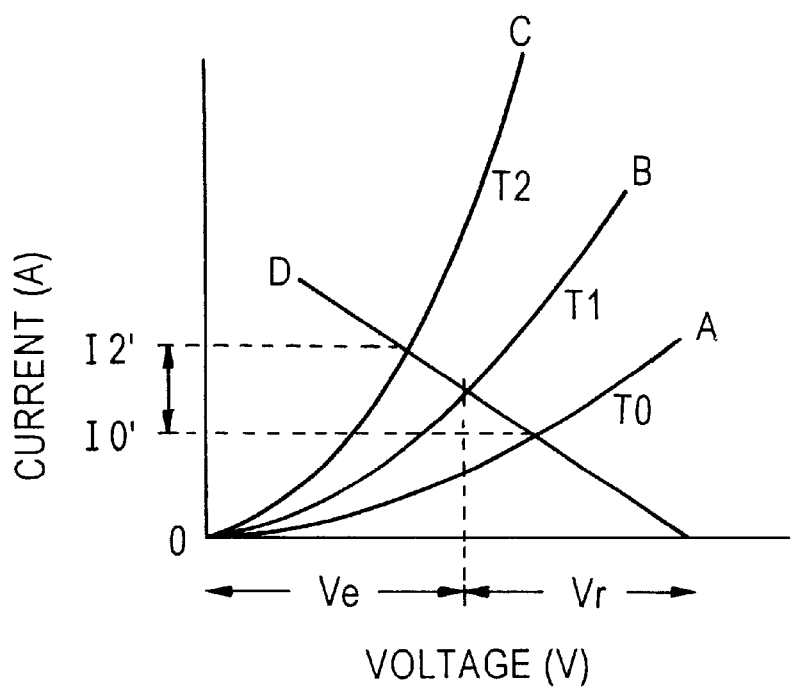
FIG. 5 is a graph showing the voltage-current characteristics of the driver circuit shown in FIG. 4.
Figure 6:
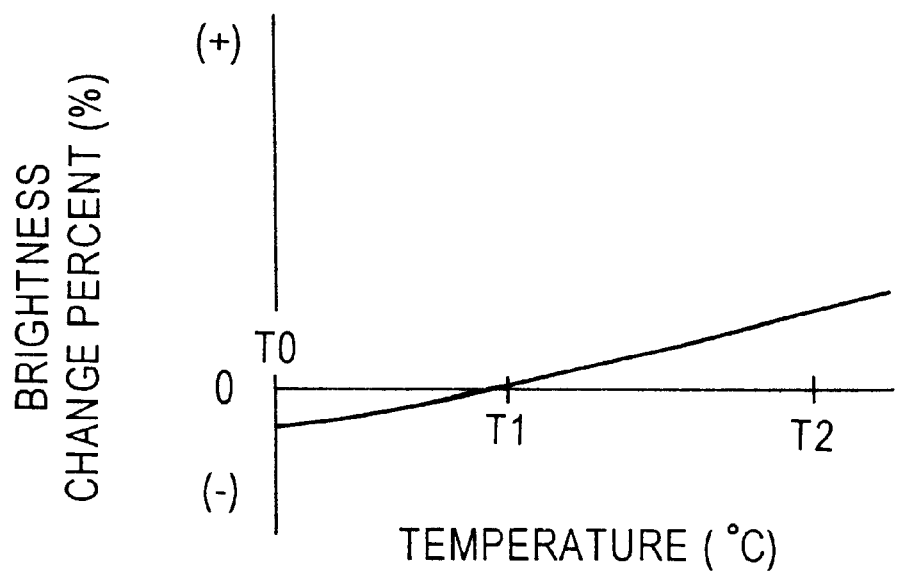
FIG. 6 is a graph showing the temperature-brightness change percent characteristics of the driver circuit shown in FIG. 4.

A driver circuit in accordance with a second embodiment of the invention is shown in FIGS. 4–6. The second embodiment is an improvement on the first embodiment. Note that like components are indicated by like reference numerals in various figures. In FIG. 4, an organic electroluminescent (EL) device 1 and a resistor 5 are electrically connected to form a series circuit. A DC power supply 4 is connected with this series circuit. In particular, the resistor 5 is connected with the anode 2 of the EL device 1, thus forming the series circuit. The DC power supply 4 is connected with this series circuit.

The driver circuit of this construction shows voltage-current characteristics shown in FIG. 5. The operating point of the EL device 1 is given by the intersection of the voltage-current characteristic curve A, B, or C of FIG. 5 at different ambient temperature T0, T1, or T2 with the voltage-current characteristic line D of the resistor 5 in FIG. 5. It follows that the current varies from $I_0'$ to $I_2'$ (within range Y) at a given voltage V. At ambient temperature T1, voltage Ve is applied to the organic EL device 1, and voltage Vr is applied to the resistor 5. The gradient of the voltage-current characteristic line of the resistor 5 is determined by 1/R, where R is the resistance of the resistor 5.

In this embodiment, the brightness of the organic EL device 1 varies to a lesser extent than in the previous embodiment because of the relation X>Y (see FIG. 6). In the second embodiment, the resistor 5 is required to be connected with only one of the anode 2 and the cathode 3 of the organic EL device.

The present invention can provide a driver circuit that drives an organic EL device, is simple in structure, and is made up of an unincreased number of components.

What is claimed is:

1. A driver circuit for use with an organic electroluminescent (EL) device having a transparent substrate, an anode made of a transparent conductive material and formed on said substrate, at least one organic layer formed on said anode, and a cathode made of a conductive metal material and formed on said organic layer, said driver circuit comprising:

a DC power supply connected in series with said organic EL device to drive it with a constant voltage.

2. A driver circuit for use with an organic electroluminescent (EL) device having a transparent substrate, an anode made of a transparent conductive material and formed on said substrate, at least one organic layer formed on said anode, and a cathode made of a conductive metal material and formed on said organic layer, said driver circuit comprising:

a resistor electrically connected with said organic EL device to form a series circuit; and a DC power supply connected with said series circuit.

3. A driver circuit for use with an organic electroluminescent (EL) device having a transparent substrate, an anode made of a transparent conductive material and formed on said substrate, at least one organic layer formed on said anode, and a cathode made of a conductive metal material and formed on said organic layer, said driver circuit comprising:

a resistor connected with at least one of said anode and said cathode of said organic EL device to form a series circuit; and a DC power supply connected with said series circuit.

* * * * *